Sept. 4, 1928.

D. W. R. MORGAN

CONDENSER

Filed Aug. 9, 1922

1,683,393

WITNESSES:
R. E. B. Wakefield
W. S. Beckley

D. W. R. Morgan
INVENTOR

BY
ATTORNEY

Patented Sept. 4, 1928.

1,683,393

UNITED STATES PATENT OFFICE.

DAVID W. R. MORGAN, OF SWARTHMORE, PENNSYLVANIA, ASSIGNOR TO WESTINGHOUSE ELECTRIC AND MANUFACTURING COMPANY, A CORPORATION OF PENNSYLVANIA.

CONDENSER.

Application filed August 9, 1922. Serial No. 580,719.

My invention relates to surface condensers, more particularly to means for fastening condenser tubes into the tube plates of condensers and has for an object to provide a simple, inexpensive and efficient means of the character designated which shall permit longitudinal movements of the tubes with respect to a supporting tube plate and at the same time maintain a fluid-tight joint between the tube and plate.

Figure 1:
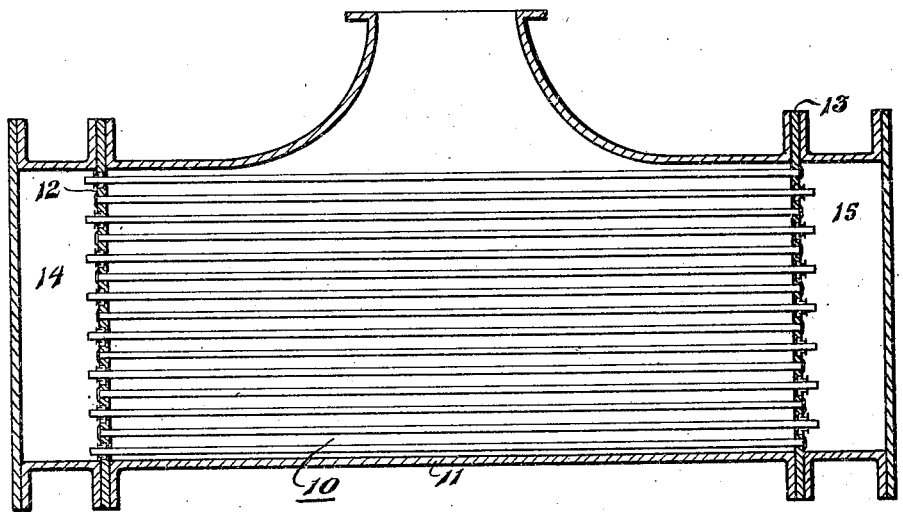
Figure 2:
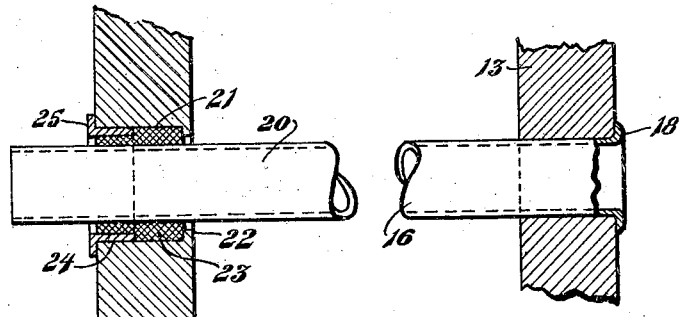
Figure 3:
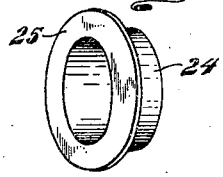

These and other objects, which are more manifest in the further description of my invention, may be attained in the apparatus illustrated in the accompanying drawings in which Fig. 1 is a view in longitudinal section of a surface condenser in which the tubes are mounted in accordance with the present invention; Fig. 2 is a detailed view, on an enlarged scale, of one of the condenser tubes, illustrating the tube plates; and Fig. 3 is a view in perspective of the ferrule employed to retain the tube packing.

Referring to the drawings, I show a surface condenser 10 of a conventional type having a shell 11, tube plates 12, 13, water boxes 14, 15, and tubes 16 supported in the tube plates 12, 13 and opening into the water boxes 14 and 15. Each of the tubes 16 is rigidly secured at one end to one of the tube plates in any well known manner, as by expanding and swedging the tube end as at 18 (Fig. 2). The other end of each of the tubes is secured to the tube plate at the opposite end of the condenser by means of a novel joint arrangement 20, which is so constructed as to permit of the sliding of the tubes 16 with respect to the tube plate caused by the expansion and contraction of the tubes under varying temperatures without allowing leakage of fluids through the joint. The joints 20 may all be made in one tube sheet, or alternate tubes may be rigidly mounted in the second plate, as shown in Fig. 1.

As more particularly shown in Fig. 2, the slip joint 20 is constructed by counter-boring the tube plate 12 to form an opening 21 of considerably larger diameter than the tube except adjacent the inner surface of the plate where the opening is made only slightly larger than the tube. There is thus formed a shoulder 22 which holds the packing 23 in place when pressed into the space between the tube 16 and the plate 12.

The packing 23 may be of any material commonly used for packing condenser tubes. For example, the packing may be of a fibrous material or of a soft metal pressed into the packing space by an up-setting tool. In order to prevent the loosening of the packing, a ferrule 24 of relatively hard metal, of a size to enter the opening 21 with a driving fit, is forced into the opening 21. Preferably, the ferrule is a smooth casing having an outwardly-turned flange 25 which sets up tightly against the surface of the plate 12.

It will be observed that the opening 21 has a smooth bore and that the ferrule 24 has smooth contacting surface. There is thus eliminated the work and expense incident to threaded or grooved tube openings and fittings commonly employed in condenser tube fastenings. Further, the ferrule engages the opening with a force fit so that a rigid holding means for the packing is provided.

The condenser tubes are mounted in the tube-plates, in accordance with this invention, in the following manner:

The tubes are inserted in their respective openings and the packing inserted in the openings 21. The end to be rigidly secured to a tube plate is then expanded or otherwise fixedly mounted therein. The soft metal is now forced tightly into place with a suitable up-setting tool and the ferrule driven into the packing so that its flange snugly fits the surface of the plate.

In this way the packing is compressed against the end of the counterbore 21 and between the counterbore and the tube, as well as between the ferrule and the tube. By compressing the packing between the ferrule and the tube it is possible to obtain maximum wearing surface between the packing and the tube for a tube sheet of a given thickness. This prolongs the life of the packing and also makes a better seal about the tube at all times.

Furthermore, securing the ferrule directly to the tube plate assures a rigid connection between the ferrule and the plate and avoids any tendency for the ferrule to work loose as would be the case if the packing extended between the ferrule and the tube plate.

The simplicity and low cost of the parts employed, and the readiness with which the tubes are assembled, combine to produce a very desirable slidable joint both from the standpoint of expense of materials employed and the time involved in assembly. When it is considered that a surface condenser of the character employed in power plants of central stations has several hundred tubes, the advantage of the present means of assembly of the condensed tubes becomes apparent.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. A condenser tube fastening for slidably mounting a tube in a tube sheet with a fluid tight fit, comprising a tube sheet having openings therein, certain of said openings having smooth walled counterbores, a ferrule engaging a portion of said counterbore with a driven fit and a packing between the tube and the ferrule and between the tube and that portion of the counterbore which is not engaged by the ferrule.

2. A condenser tube fastening for slidably mounting a tube in a tube sheet with a fluid tight fit, comprising a tube sheet having openings therein, certain of said openings having smooth walled counterbores, a ferrule having a smooth uninterrupted exterior surface engaging a portion of said counterbore with a compression fit and a packing between the tube and the ferrule and between the tube and that portion of the counterbore which is not engaged by the ferrule, said ferrule having a flange engaging the tube sheet adjacent said counterbore.

In testimony whereof, I have hereunto subscribed my name this 8th day of August 1922.

DAVID W. R. MORGAN.